US012665673B2

(12) United States Patent
Kalman et al.

(10) Patent No.: US 12,665,673 B2
(45) Date of Patent: Jun. 23, 2026

(54) PARALLEL MICROLED-BASED FREE SPACE OPTICAL INTERCONNECTS

(71) Applicant: AvicenaTech Corp., Sunnyvale, CA (US)

(72) Inventors: Robert Kalman, Sunnyvale, CA (US); Bardia Pezeshki, Sunnyvale, CA (US); Alexander Tselikov, Sunnyvale, CA (US); Cameron Danesh, Sunnyvale, CA (US)

(73) Assignee: AvicenaTech, Corp., Sunnyvale, CA (US)

( * ) Notice: Subject to any disclaimer, the term of this patent is extended or adjusted under 35 U.S.C. 154(b) by 0 days.

(21) Appl. No.: 18/113,398

(22) Filed: Feb. 23, 2023

(65) Prior Publication Data

US 2023/0268999 A1     Aug. 24, 2023

Related U.S. Application Data

(60) Provisional application No. 63/268,421, filed on Feb. 23, 2022.

(51) Int. Cl.
  *H04B 10/40*          (2013.01)
  *G02B 6/42*           (2006.01)
        (Continued)

(52) U.S. Cl.
  CPC ........... *H04B 10/40* (2013.01); *G02B 6/4246* (2013.01); *G02B 6/4269* (2013.01); *G02B 6/43* (2013.01);
        (Continued)

(58) Field of Classification Search
  None
  See application file for complete search history.

(56) References Cited

U.S. PATENT DOCUMENTS 6,845,184 B1 *  1/2005  Yoshimura .............. H01L 23/48
                                          385/9
2013/0142211 A1 *  6/2013  Doany ...................... H01S 5/40
                                          257/443
                (Continued)

FOREIGN PATENT DOCUMENTS

CN          112234118 A  *  1/2021  .......... H01L 31/153
WO     WO 2021/142340        7/2021
WO     WO 2021/247575       12/2021

OTHER PUBLICATIONS

International Search Report from International Searching Authority (KIPO) in related PCT Application No. PCT/US2023/013705 dated Jun. 13, 2023.

(Continued)

*Primary Examiner* — Li Liu

(57)          ABSTRACT

Optically coupling two or more optical transceiver integrated circuits (OTRIC) using OTRIC-on-substrate assemblies is disclosed. The optical transceiver integrated circuits may be attached to different substrates, where the substrates may allow the passage of optical signals to and from the optical transceiver integrated circuits. The OTRIC-on-substrate assemblies may comprise one or more optoelectronic device arrays, lenses and mirrors, mounts, and optical transmission medium. The optical transmission medium may be free space or and optical fiber. An optical coupling mechanism may be used in conjunction with the OTRIC-on-substrate assemblies to link optical signals between the optical transceiver integrated circuits.

15 Claims, 9 Drawing Sheets

(51) Int. Cl.
G02B 6/43 (2006.01)
H04B 10/114 (2013.01)
H04B 10/50 (2013.01)

(52) U.S. Cl.
CPC ......... H04B 10/1143 (2013.01); H04B 10/50 (2013.01)

(56) References Cited

U.S. PATENT DOCUMENTS

| | | | |
|---|---|---|---|
| 2015/0180572 A1* | 6/2015 | Katayama .......... | G02B 26/0816 |
| | | | 398/118 |
| 2015/0262984 A1 | 9/2015 | Krabe et al. | |
| 2015/0333831 A1* | 11/2015 | Lai ......................... | G02B 6/428 |
| | | | 250/208.2 |
| 2015/0341113 A1* | 11/2015 | Krug .................... | H04B 10/116 |
| | | | 398/118 |
| 2016/0226592 A1* | 8/2016 | Arvelo .................... | G02B 6/425 |
| 2018/0122978 A1* | 5/2018 | Khatibzadeh .......... | H01L 33/06 |
| 2018/0239096 A1* | 8/2018 | Houbertz ............. | G02B 6/4214 |
| 2020/0411587 A1* | 12/2020 | Pezeshki ............... | H01L 27/156 |
| 2021/0080664 A1 | 3/2021 | Pezeshki et al. | |
| 2021/0320718 A1 | 10/2021 | Kalman et al. | |
| 2021/0320721 A1 | 10/2021 | Weverka et al. | |
| 2021/0320726 A1 | 10/2021 | Kalman et al. | |
| 2022/0045123 A1* | 2/2022 | Yang .................... | H10H 20/857 |
| 2022/0069914 A1 | 3/2022 | Kalman et al. | |
| 2022/0286211 A1 | 9/2022 | Pezeshki et al. | |
| 2023/0097800 A1* | 3/2023 | Fryman ................ | H04B 10/801 |
| | | | 398/182 |
| 2023/0124794 A1* | 4/2023 | Pfeffer ................. | H10H 20/856 |
| | | | 257/98 |
| 2023/0232138 A1* | 7/2023 | Rivaud .............. | H04Q 11/0005 |
| | | | 398/45 |
| 2023/0253377 A1* | 8/2023 | Schuele ................. | H10H 20/01 |
| | | | 438/34 |
| 2023/0296835 A1* | 9/2023 | Kalman ............... | H10H 20/856 |
| | | | 385/14 |

OTHER PUBLICATIONS

Written Opinion from International Searching Authority (KIPO) in related PCT Application No. PCT/US2023/013705 dated Jun. 13, 2023.

Extended European Search Report the European Patent office (EPO) in related EP Application No. 23760642.1 dated May 12, 2025.

Bockstaele et al., "A Parallel Optical Interconnect Link With On-Chip Optical Access", Micro-Optics, VCSELs, and Photonic Interconnects, Proceedings of SPIE, vol. 453, Photonics Europe, Apr. 26-30, 2004.

Liang et al., "Hybrid Integrated Platforms for Silicon Photonics", Materials 2010, vol. 3, pp. 1782-1802, Match 12, 2010.

Roelkens et al., "III-V/Silicon Photonics for On-chip and Inter-chip Optical Interconnects", Laser Photonics Review 4, No. 6, pp. 751-779, Jan. 11, 2010.

Rooman et al., "Asynchronous 250-Mb/s Optical Receivers with Integrated Detector in Standard CMOS Technology for Optocoupler Applications", IEEE Journal of Solid-State Circuits, vol. 35, No. 7, Jul. 2000.

Rooman et al., "High-Efficiency AlGaInP Thin-Film LEDs Using Surface-Texturing and Waferbonding with Conductive Epoxy", IEEE Photonics Technology Letters, vol. 17, No. 12, Dec. 2005.

Rooman et al., "Inter-Chip Optical Interconnects Using Imaging Fiber Bundles and Integrated CMOS Detectors", Proceedings 27th 27th European Conference on Optical Communication (ECOC), pp. 296-297, Sep. 30, 2001-Oct. 4, 2001.

Rooman et al., "Low-Power Short-Distance Optical Interconnect using Imaging Fibre Bundles and CMOS Detectors", IEEE Proceedings, 2000 Digest of the LEOS Summer Topical Meetings, Jul. 24-28, 2000.

Windisch et al., "Large-Signal-Modulation of High-Efficiency Light-Emitting Diodes for Optical Communication", IEEE Journal of Quantum electronics, vol. 36, No. 12, Dec. 2000.

Windisch et al., "Light-Extraction Mechanisms in High-Efficiency Surface-Textured Light-Emitting Diodes", IEEE Journal on selected Topics in Quantum Electronics, vol. 8, No. 2, Mar./Apr. 2002.

* cited by examiner

PARALLEL MICROLED-BASED FREE SPACE OPTICAL INTERCONNECTS

CROSS-REFERENCE TO RELATED APPLICATIONS

This application claims the benefit of U.S. Provisional Patent Application No. 63/268,421, filed on Feb. 23, 2022, the disclosure of which is incorporated by reference herein.

FIELD OF INVENTION

The present invention is related generally to optical transceiver integrated circuits, and more particularly to optically coupling two or more optical transceiver integrated circuits together.

BACKGROUND OF THE INVENTION

Computing and networking performance needs are seemingly ever-increasing. Prominent applications driving these needs include data center servers, high-performance computing clusters, artificial neural networks, and network switches.

For decades, dramatic integrated circuit (IC) performance and cost improvements were driven by shrinking transistor dimensions combined with increasing die sizes, summarized in the famous Moore's Law. Transistor counts in the billions have allowed consolidation onto a single system-on-a-chip (SoC) of functionality that was previously fragmented across multiple ICs. However, Moore's Law appears to be reaching its limits as shrinking feature sizes below 10 nm results in decreasing marginal performance benefits with decreased yields and increased per-transistor costs.

Beyond these limitations, a single IC can only contain so much functionality, and that functionality is constrained because the IC's process cannot be simultaneously optimized for different functionality, e.g. logic, DRAM, and I/O.

Increasingly, improving system performance is dependent on implementing very high bandwidth interconnects between multiple ICs. Inter-IC connections significantly limit performance of current systems. The power, density, latency, and distance limitations of these interconnects are far from what is desired.

Processor-memory interconnects are particularly important in computing systems. Dynamic random access memory (DRAM) is the most important form of memory due to its superior density and cost. However, DRAM is sensitive to temperature; the higher the temperature, the more frequently it needs to be refreshed. Because the memory is not accessible during refresh cycles, the increasing DRAM refresh rates at higher temperatures causes a loss of usable memory access bandwidth.

The trend in the highest performance DRAM such as High Bandwidth Memory (HBM) is to co-package the DRAM with high-performance processors in a multichip package. This causes the DRAM to be heated by the adjacent hot processor chip, resulting in a significant loss in DRAM IO performance. Thermally isolating the DRAM from processor chips can provide large improvements in IO bandwidth.

Optical interconnects can enable this thermal isolation and resulting memory IO bandwidth improvements. It is well-known that optical interconnects may provide fundamental advantages over electrical interconnects, even for relatively short interconnects of <<1 meter. To date, implementations of short optical interconnects have fallen short of what is needed in power, density, environmental robustness, reliability, and or cost.

BRIEF SUMMARY OF INVENTION

Some embodiments provide an optical interconnect system having one or more optical transceiver integrated circuits, comprising: a first substrate; a first integrated circuit mounted to the first substrate; a first optical transceiver integrated circuit mounted to the first substrate, the first optical transceiver integrated circuit having a first optoelectronic device array facing a plane defined by the first substrate and configured to emit and receive parallel optical signals; the first optoelectronic device array having a first set of microLEDs and photodetectors; and a first lens facing the first optoelectronic device array and configured to relay parallel optical signals to and from the first optoelectronic device array.

In some embodiments the first substrate is transparent to allow the relaying of parallel optical signals. In some embodiments the first lens is mounted to a first lens mount on an opposite side of the first substrate, relative to the first optoelectronic device array. In some embodiments the first substrate has a first aperture positioned to allow passage of the parallel optical signals to and from the first optoelectronic device array. In some embodiments the first lens is located in the first aperture. Some embodiments further comprise a heat sink on the first integrated circuit. In some embodiments the heat sink is also on the first optical transceiver integrated circuit. In some embodiments the heat sink is attached to a first surface of the first integrated circuit opposite to a second surface of the first integrated circuit used to mount the first integrated circuit to the first substrate.

Some embodiments further comprise: a second substrate; a second integrated circuit mounted to the second substrate; a second optical transceiver integrated circuit mounted to the second substrate, the second optical transceiver integrated circuit having a second optoelectronic device array facing a plane defined by the second substrate and configured to emit and receive parallel optical signals; the second optoelectronic device array having a second set of microLEDs and photodetectors; a second lens facing the second optoelectronic device array and configured to relay parallel optical signals to and from the second optoelectronic device array; and an optical transmission medium between the first optical transceiver integrated circuit and the second optical transceiver integrated circuit. In some embodiments the first integrated circuit is a memory integrated circuit, and the second integrated circuit is a processor integrated circuit. In some embodiments the first and second optical transceiver integrated circuits face each other. In some embodiments the optical transmission medium is free-space. In some embodiments the first and second optical transceiver integrated circuits are on different package substrates and printed circuit boards. In some embodiments the first and second optical transceiver integrated circuits are placed side-by-side to each other. In some embodiments the optical transmission medium is free-space and an optical coupling mechanism having one or more turning mirrors is located between the first and second optoelectronic device arrays. In some embodiments the first and second optical transceiver integrated circuits are on different package substrates. In some embodiments the optical transmission medium is a multicore optical fiber.

These and other aspects of the invention are more fully comprehended upon review of this disclosure.

DETAILED DESCRIPTION

Figure 1:
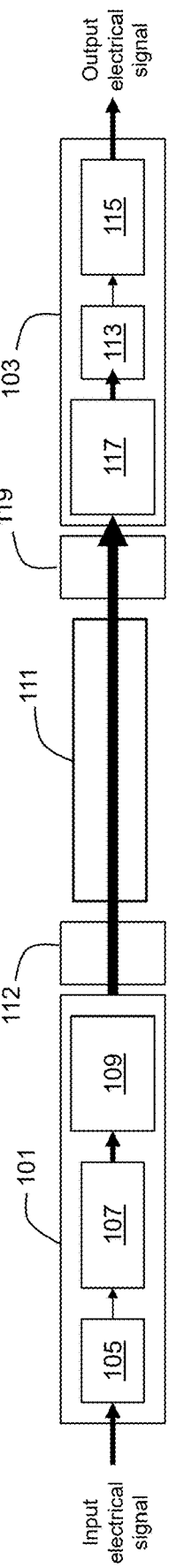
FIG. 1 is a block diagram of one embodiment of a parallel optical interconnect, in accordance with aspects of the invention.

FIG. 1 is a block diagram of one embodiment of a parallel optical interconnect. The parallel optical interconnect may have an optical transmitter 101 optically connected to an optical receiver 103. In some embodiments, an optical transmitter comprises a microLED drive circuit 105. The drive circuit is to receive an input electrical signal and drive a microLED 107. The microLED may output an optical signal modulated by the input electrical signal. In some embodiments, an optical transmitter comprises LED collector optics 109 that enables improved optical coupling efficiency to the optical transmission medium 111. In some embodiments, input coupling optics 112 may link the optical transmitter with the optical transmission medium. In some embodiments, the optical receiver 103 comprises a photodetector 113 and receiver electronics 115. In some embodiments, the receiver also includes photodetector collector optics 117 placed in front of the photodetector that increase the optical coupling efficiency from the optical transmission medium to the photodetector. In some embodiments, output coupling optics 119 may link the optical transmission medium with the optical receiver. The photodetector may convert an input optical signal to an output electrical signal. The electrical output signal from the photodetector may be connected to the receiver electronics.

In some embodiments, a microLED optical interconnect comprises: an optical transmitter comprising a microLED drive circuit that causes its input signal to be modulated onto the optical output of microLED and microLED collection optics; input coupling optics that couple light into an optical transmission medium; at the other end of the optical transmission medium, output coupling optics couple light to an optical receiver, which comprises photodetector collection optics, a photodetector, and a receiver circuit.

In some embodiments a microLED is made from a p-n junction of a direct-bandgap semiconductor material. In some embodiments, a microLED is made from GaN. In some embodiments, a microLED is made from GaAs. In some embodiments, a microLED is made from InP.

In some embodiments a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA.

In some embodiments a microLED is distinguished from a standard LED by (1) having an emitting region of less than 10 $\mu$m×10 $\mu$m; (2) frequently having cathode and anode contacts on top and bottom surfaces, whereas a standard LED typically has both positive and negative contacts on a single surface; (3) typically being used in large arrays for display and interconnect applications.

In some embodiments, each microLED used in an optical interconnect is driven with a current in the range of 10 uA to 500 uA. In some embodiments, the per-bit energy consumed by each lane of a microLED optical interconnect is in the range of 0.05 pJ/bit to 1 pJ/bit.

Figure 2:
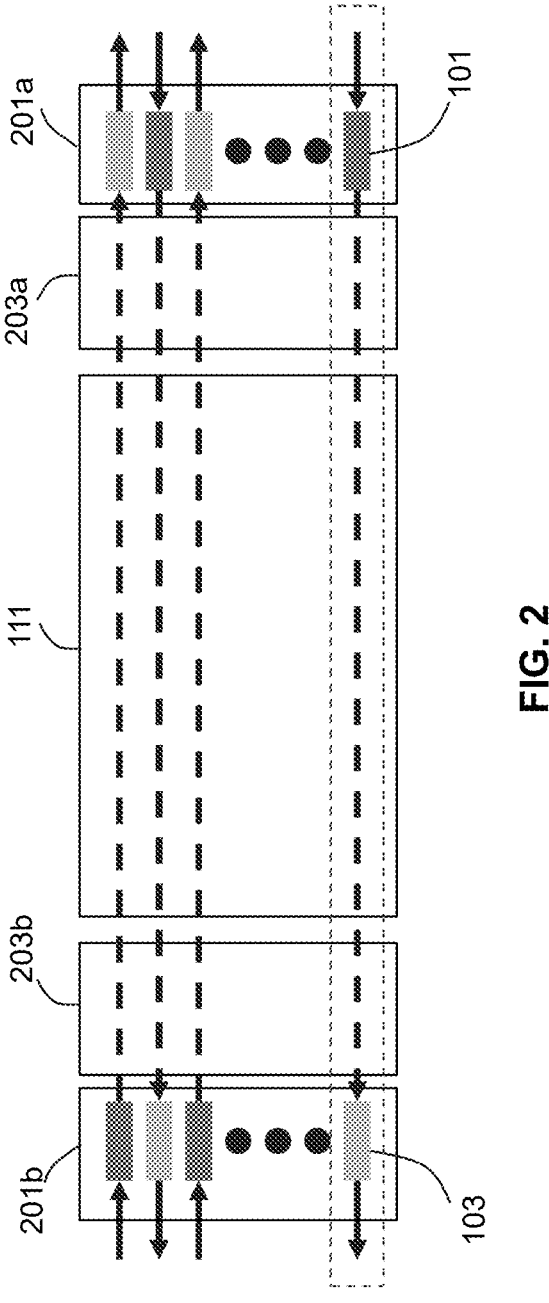
FIG. 2 is a block diagram of another embodiment of a parallel optical interconnect, in accordance with aspects of the invention.

FIG. 2 is a block diagram of another embodiment of a parallel optical interconnect. A parallel optical interconnect comprises multiple parallel optical interconnect "lanes." In some embodiments, a parallel optical interconnect comprises: a first optical transceiver array 201a, where the transceiver array comprises a plurality of optical transmitters 101 and optical receivers 103, where each optical transmitter and optical receiver may be as described above; a first optical coupling assembly 203a that couples light from the first optical transceiver array to the first end of a parallel optical transmission medium 111; a second optical transceiver array 201b similar to the first optical transceiver array; and a second optical coupling assembly 203b similar to the first optical coupling assembly, which couples light from the second optical transceiver array to a second end of the parallel optical transmission medium. In some embodiments, the first and second optical coupling assembly may each comprise input and output coupling optics 112, 119, shown in FIG. 1. In some embodiments, the optical coupling assembly may comprise one or more lenses, mirrors, or other optical components. In some embodiments, the optical transceiver array comprises an optoelectronic device array, which may comprise a mix of microLEDs and photodetectors.

The parallel optical interconnect comprises multiple interconnects where each differential interconnect comprises one differential transmitter in one transceiver array whose output light is relayed via coupling optics and the parallel optical transmission medium to a differential receiver in the other transceiver array, for example as shown in FIG. 1. In some embodiments, a parallel optical interconnect comprises 32 to 1024 lanes. In some embodiments, a parallel optical interconnect comprises more than 1024 lanes.

In some embodiments, a parallel optical interconnect comprises extra lanes that can be used for redundancy in the case that some lanes fail. The optical transceiver array, which in some embodiments may be in the form of a single IC chip with LEDs on the IC chip, may implement circuitry enabling fail-over to these redundant lanes. In some embodiments, a parallel optical interconnect comprises lanes used for clock forwarding, which obviates the need for clock recovery circuitry on the receiving side of each parallel optical interconnect lane. In some embodiments, a parallel optical interconnect comprises lanes that are used for error-correcting coding (ECC). Through appropriate encoding and decoding circuitry at the two ends of a parallel optical interconnect, the data on the ECC lanes can be used to detect and correct data transmission errors.

In some embodiments, each parallel optical interconnect lane has a throughput in the range of 1 Gbps to 10 Gbps. In some embodiments of a parallel optical interconnect, emitter and detector elements are arranged on a regular grid. In some embodiments, this grid may be square or rectangular. In some embodiments, this grid may be hexagonal close-packed (HCP). In some embodiments, the spacing between grid elements is in the range of 10 μm to 50 μm.

In some embodiments, the parallel optical transmission medium 111 comprises free space and may also comprise lenses and/or mirrors. In some embodiments, the parallel optical transmission medium comprises one or more multi-core optical fibers.

Figure 3:
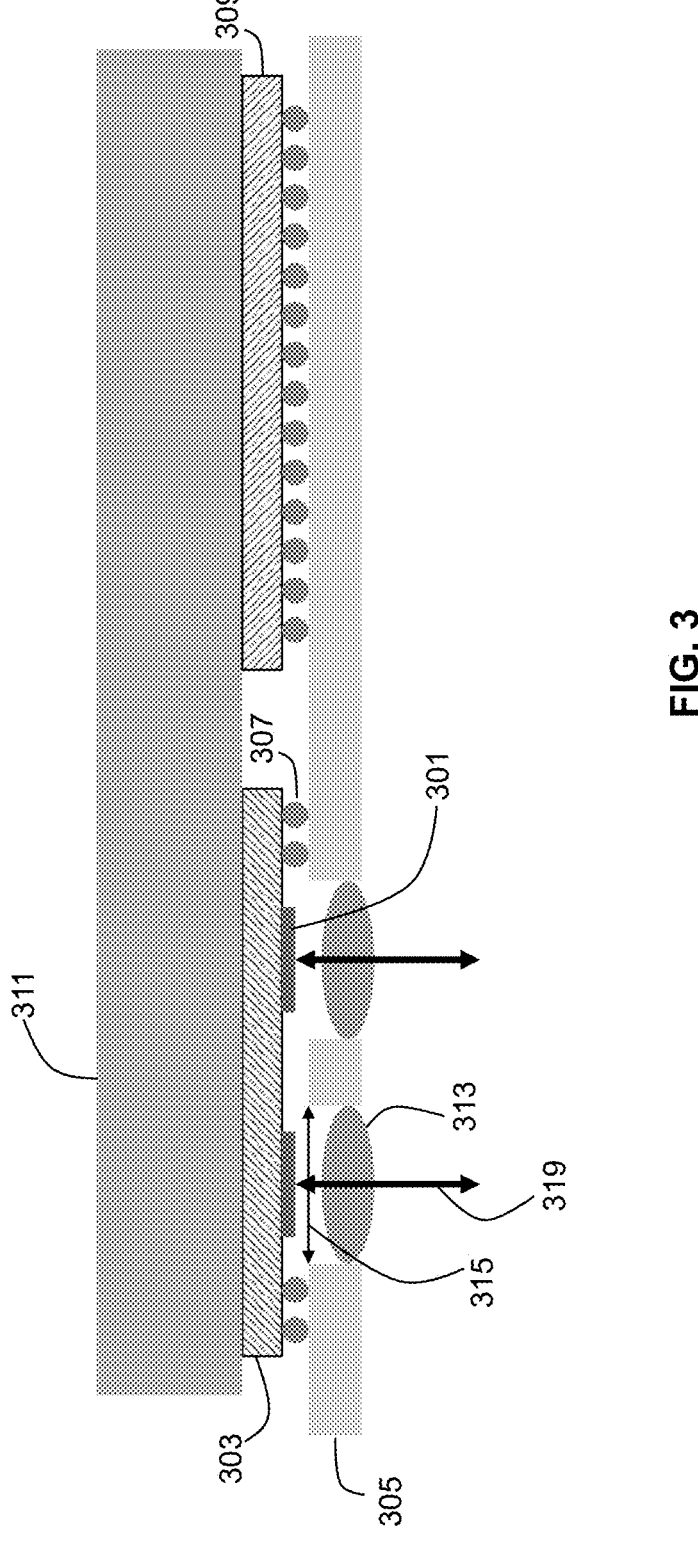
FIG. 3 shows one embodiment of an optical transceiver IC mounted to a substrate and the associated coupling optics, in accordance with aspects of the invention.

FIG. 3 shows one embodiment of an optical transceiver IC mounted to a substrate and the associated coupling optics. In some embodiments of a parallel optical interconnect, the transceiver array comprises an IC to which microLEDs are bonded, for instance using solder bonding or direct metal-metal bonding. In some embodiments, photodetectors are monolithically integrated onto the IC. In some embodiments, photodetectors are bonded to the IC, for instance using solder bonding, direct bonding, or epoxy bonding. In some embodiments, the photodetectors and microLEDs may be part of an optoelectronic device array 301. In some embodiments, an IC may comprise one or more transceiver arrays, where the optoelectronic device arrays are attached to the transceiver arrays, and the IC may also comprise a variety of other circuitry for input/output (IO), computation, switching, and/or memory. An IC that comprises one or more optical transceiver arrays may be referred to as an optical transceiver IC (OTRIC) 303.

In some embodiments of a parallel optical interconnect, each of the optical transceiver ICs are attached to a substrate 305 using solder bumps 307, where parallel optical signals 319, in the form of light, is transmitted to and from each optical transceiver IC and can pass through the substrate. In some embodiments, such transmission of light may be accomplished because the optoelectronic device array that is mounted to the optical transceiver IC is facing the substrate. In some embodiments, other ICs 309 may also be attached to the substrate. In some embodiments, the substrate comprises electrical connections to the optical transceiver IC and other ICs in the form of solder bumps. In some embodiments, the substrate is made from silicon, laminated organic layers, or glass.

In some embodiments, a heat sink 311 is attached to a surface of each IC, optical transceiver IC and other ICs, opposite of the surfaces of the ICs attached to the substrate. In some embodiments, for each optical transceiver IC, coupling optics comprising one or more lens elements 313 is attached to the substrate such that the lenses relay parallel optical signals 319, in the form of light, to and from the optical transceiver IC. An assembly comprising one or more optoelectronic device arrays and the associated coupling optics may be referred to as an "OTRIC-on-substrate assembly."

In some embodiments, the substrate has one or more apertures 315 that allow light to propagating to and from the optical transceiver IC, as shown in FIG. 3. In some embodiments, coupling optics comprising one or more lens elements are inserted into the apertures in the substrate.

Figure 4:
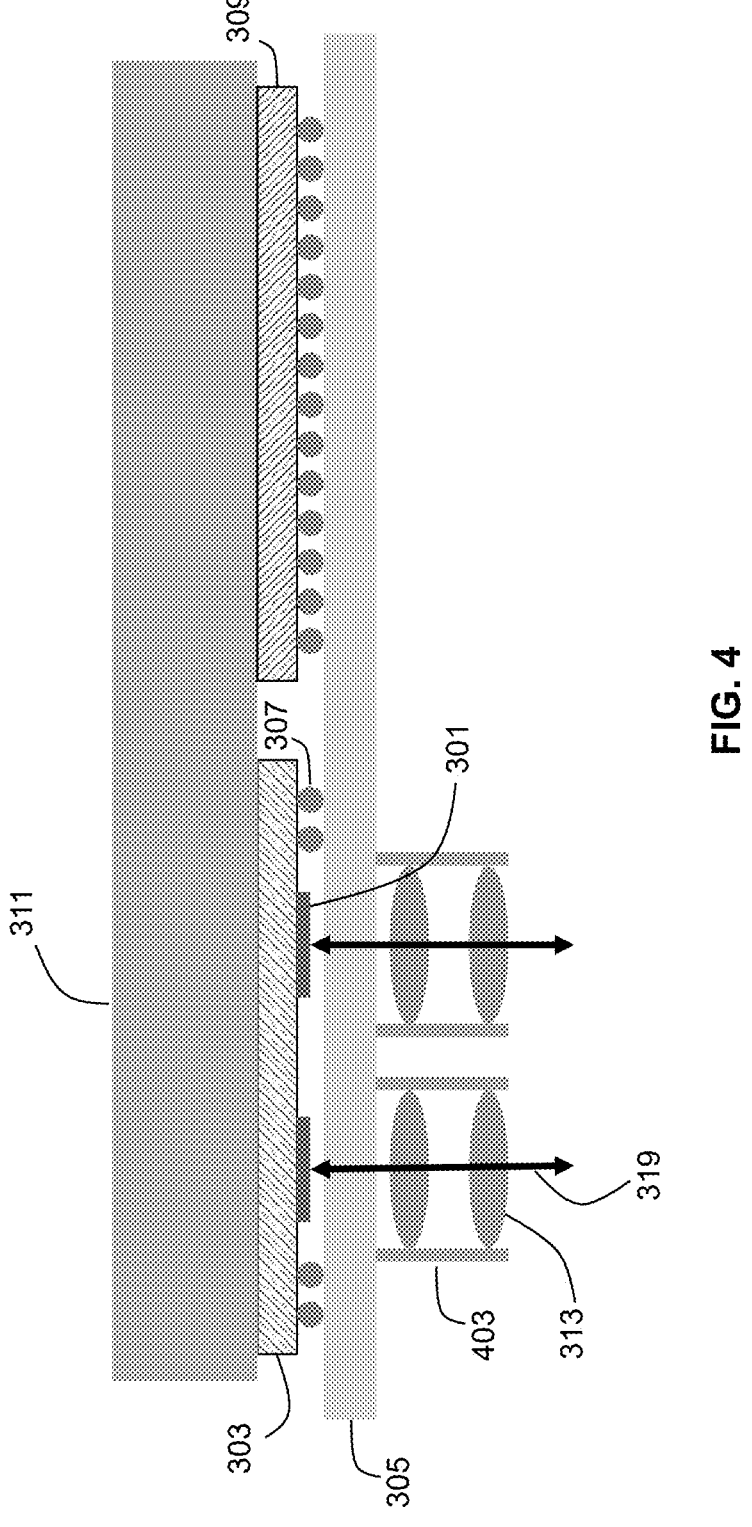
FIG. 4 shows another embodiment of an optical transceiver IC mounted to a substrate and the associated coupling optics, in accordance with aspects of the invention.

FIG. 4 shows another embodiment of an optical transceiver IC mounted to a substrate and the associated coupling optics. In some embodiments, the substrate 305 is transparent to light propagating to and from the optical transceiver IC 303 having the optoelectronic device array 301. In some embodiment, such transmission of light may be accomplished because the optoelectronic device array that is mounted to the optical transceiver IC is facing the substrate. In some embodiments, lens elements 313 are attached to the surface of the transparent substrate that is opposite to the optical transceiver IC via a lens mount 403, as shown in FIG. 4. In some embodiments where the substrate is transparent, the substrate comprises convex surfaces, each of which acts as a lens for an optical transceiver IC. In some embodiments, the lens elements are made from polymer. In some embodiments, the lens elements are made from glass.

Figure 5:
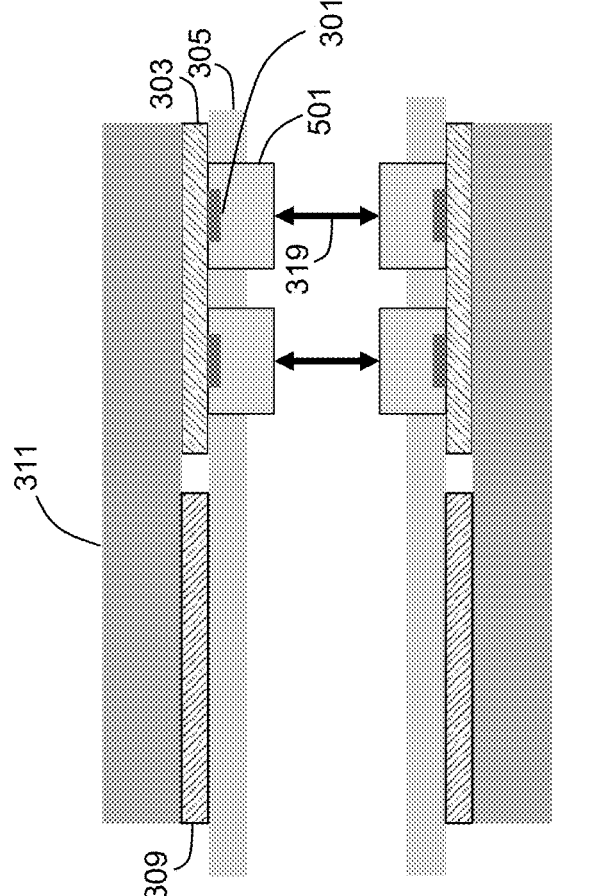
FIG. 5 shows one embodiment of optically connecting optical transceiver ICs together, in accordance with aspects of the invention.

FIG. 5 shows one embodiment of optically connecting optical transceiver ICs together. In some embodiments, multiple optical transceiver IC (OTRIC) on substrate assemblies ("OTRIC-on-substrate assemblies") 501 are oriented such that light from the transmitters on one optical transceiver IC is imaged onto the receivers on another optical transceiver IC. As explained elsewhere herein, the OTRIC-on-substrate assembly may comprise one or more optoelectronic device arrays 301 and the associated coupling optics, as shown in FIGS. 3-4. In some embodiments, the substate 305 may be the transparent substrate, shown in FIG. 4, or the substrate having apertures for light transmission, shown in FIG. 3. In some embodiments, the optics between two optical transceiver ICs is a "4f" imaging system such that each of the optical transceiver ICs is located one focal length from its associated lens, and the two lenses associated with their respective optical transceiver ICs are separated by the sum of the two lens focal lengths. In some embodiments, the optical transceiver ICs on different substrates face each other, along with their OTRIC-on-substrate assemblies, and the optical transmission medium between them may be free-space, as shown in FIG. 5. Such arrangement may use free-space optical elements like lenses and mirrors to implement hundreds or thousands of parallel interconnects between optical transceiver ICs.

Figure 6:
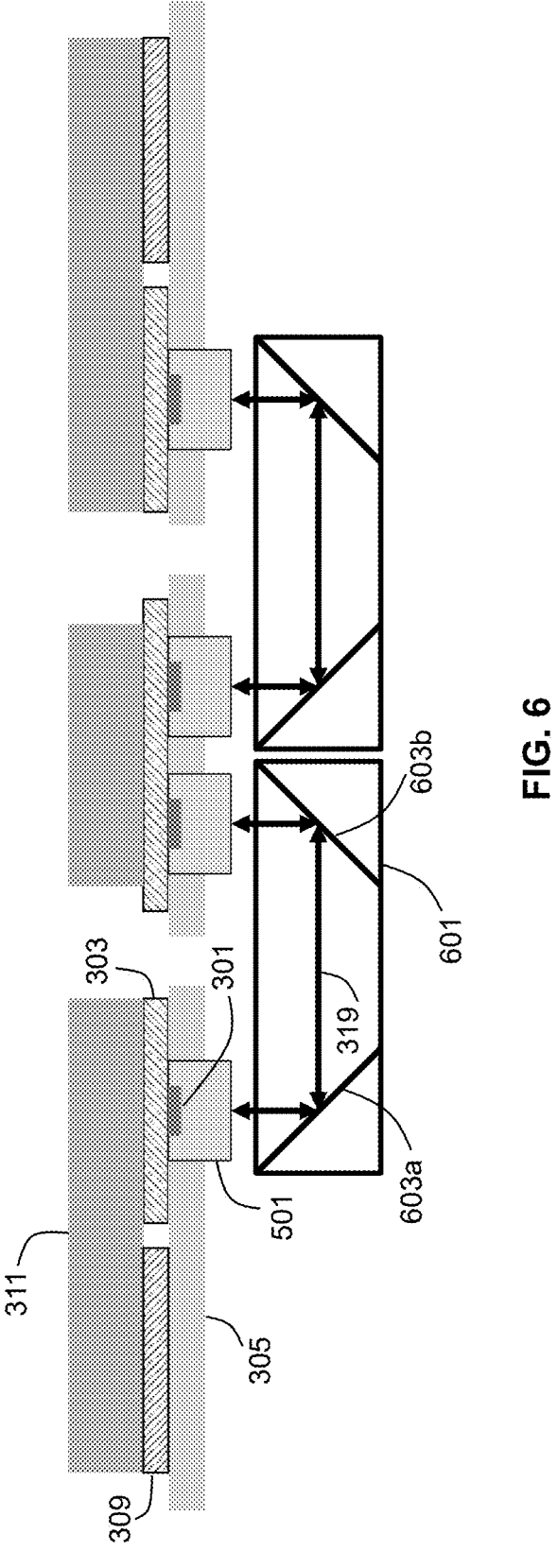
FIG. 6 shows another embodiment of optically connecting optical transceiver ICs together, in accordance with aspects of the invention.

FIG. 6 shows another embodiment of optically connecting optical transceiver ICs together. In some embodiments, the optical transceiver ICs 303, along with their OTRIC-on-substrate assemblies 501, are placed side-by-side to each other on different substrates and light is relayed between optical transceiver ICs using turning mirrors, where the optical transmission medium may be free-space. Such arrangement may use free-space optical elements like lenses and mirrors to implement hundreds or thousands of parallel interconnects between optical transceiver ICs.

As shown in FIG. 6, an optical coupling mechanism 601 may be arranged between the OTRIC-on-substrate assemblies 501 that are placed side-by-side to each other. The optical coupling mechanism 601 may have one or more turning mirrors 603a-b to reflect light and relay the parallel optical signals 319 from one optical transceiver IC 303 to the other optical transceiver IC on a different substrate. In one embodiment, the optical coupling mechanism may have two turning mirrors, where each turning mirror is orientated at an angel facing one of the OTRIC-on-substrate assemblies of the optical transceiver ICs. As such, light may be reflected by the first turning mirror 603*a* towards the second turning mirror 603*b*, for example by changing direction by 90-degrees from the normal direction of the emitting OTRIC-on-substrate assembly. The second turning mirror 603*b* may then change the direction of light to reflect normal to the receiving OTRIC-on-substrate assembly on the different substrate. In some embodiments, more than two optical transceiver ICs that are on different substrates may be optically connected to each other using the mechanisms described herein, specifically by the usage of one or more optical coupling mechanisms shown in FIG. 6.

In some embodiments, the optical coupling mechanisms may be part of the optical coupling assemblies 203*a-b*, as shown in FIG. 2. In some embodiments, the substate 305 shown in FIG. 6 may be the transparent substrate, shown in FIG. 4, or the substrate having apertures for light transmission, shown in FIG. 3.

Such arrangements shown in FIGS. 5-6, for example, may enable a very high density of connections and of data throughput. For instance, emitter and detector elements on a 25 μm square grid with each lane operating at 10 Gbps may provide a density of 16 Tbps/mm2. Optical transceiver ICs on separate substrates also may enable high thermal isolation between optical transceiver ICs. This is highly beneficial in cases where certain optical transceiver ICs are sensitive to temperature. For instance, the ICs on one substrate may comprise memory ICs, specifically DRAM ICs, while the ICs on the other substrate may comprise processor ICs that need to interface to the DRAM ICs. By using a parallel optical interconnect between the substrates, very high data throughput and density between the processor ICs and DRAM ICs can be achieved while at the same time achieving high thermal isolation between the ICs on the two substrates. Given appropriate heat sinking, this allows the DRAM ICs to run at much lower temperature than the processor ICs.

Figure 7:
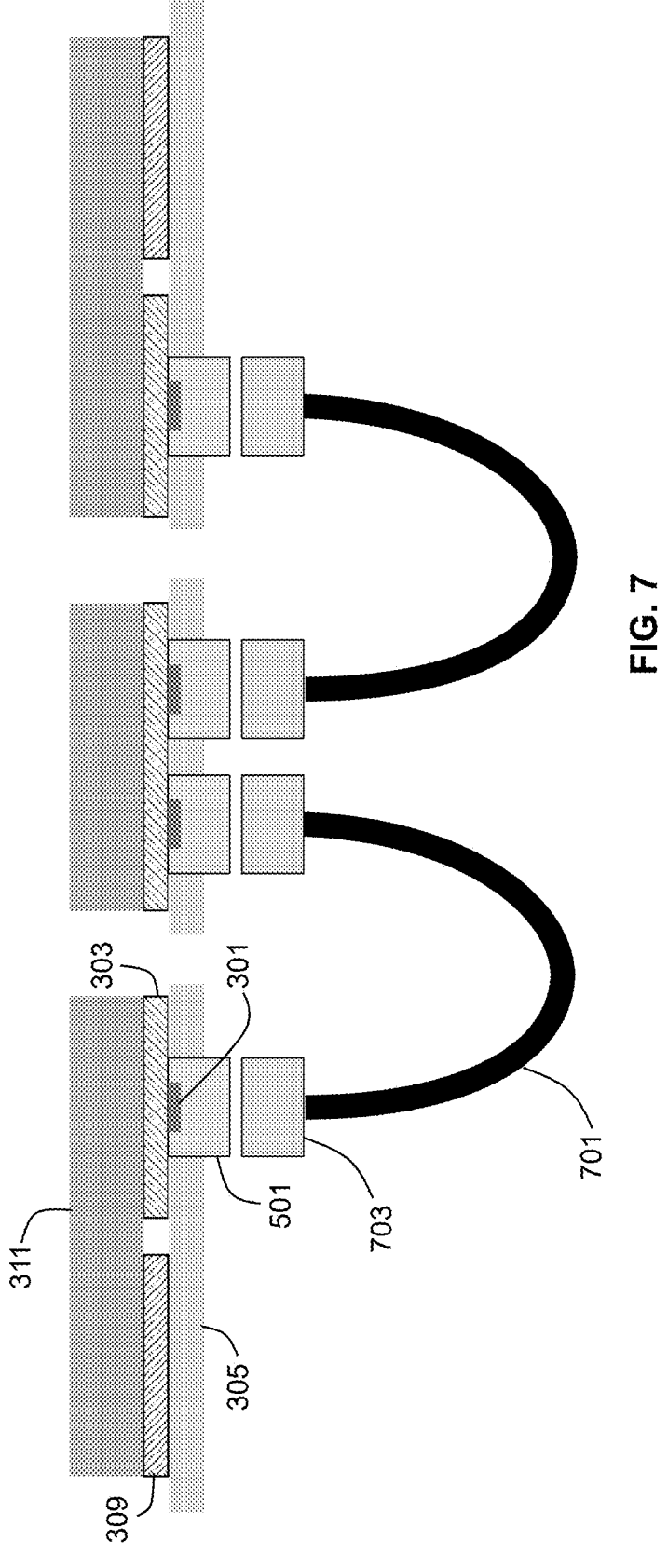
FIG. 7 shows another embodiment of optically connecting optical transceiver ICs together, in accordance with aspects of the invention.

FIG. 7 shows another embodiment of optically connecting optical transceiver ICs together. In some embodiments, light is relayed between OTRIC-on-substrate assemblies 501 using one or more multicore optical fibers 701. In some embodiments, additional fiber coupling optics 703 are interposed between the OTRIC-on-substrate assemblies and the multicore optical fiber. In some embodiments, the additional fiber coupling optics may be part of the optical coupling assemblies 203*a-b*, or be the same, as shown in FIG. 2. These fiber coupling optics may improve optical coupling efficiency to the multicore optical fiber and/or make it more practical to assemble the system, for instance by loosening alignment tolerances. In some further embodiments, each parallel optical interconnect lane is carried in a single core of the multicore optical fiber, while in other embodiments each parallel optical interconnect lane is carried in multiple cores of the multicore optical fiber.

A multicore optical fiber comprises multiple cores, each of which is surrounded by cladding, where the index of refraction of the core is higher than that of the cladding. In some embodiments, the relative positions of the cores are retained on the two fiber ends, which is referred to as "coherent" multicore optical fiber. The cross-section of each core is typically approximately circular.

Figure 8:
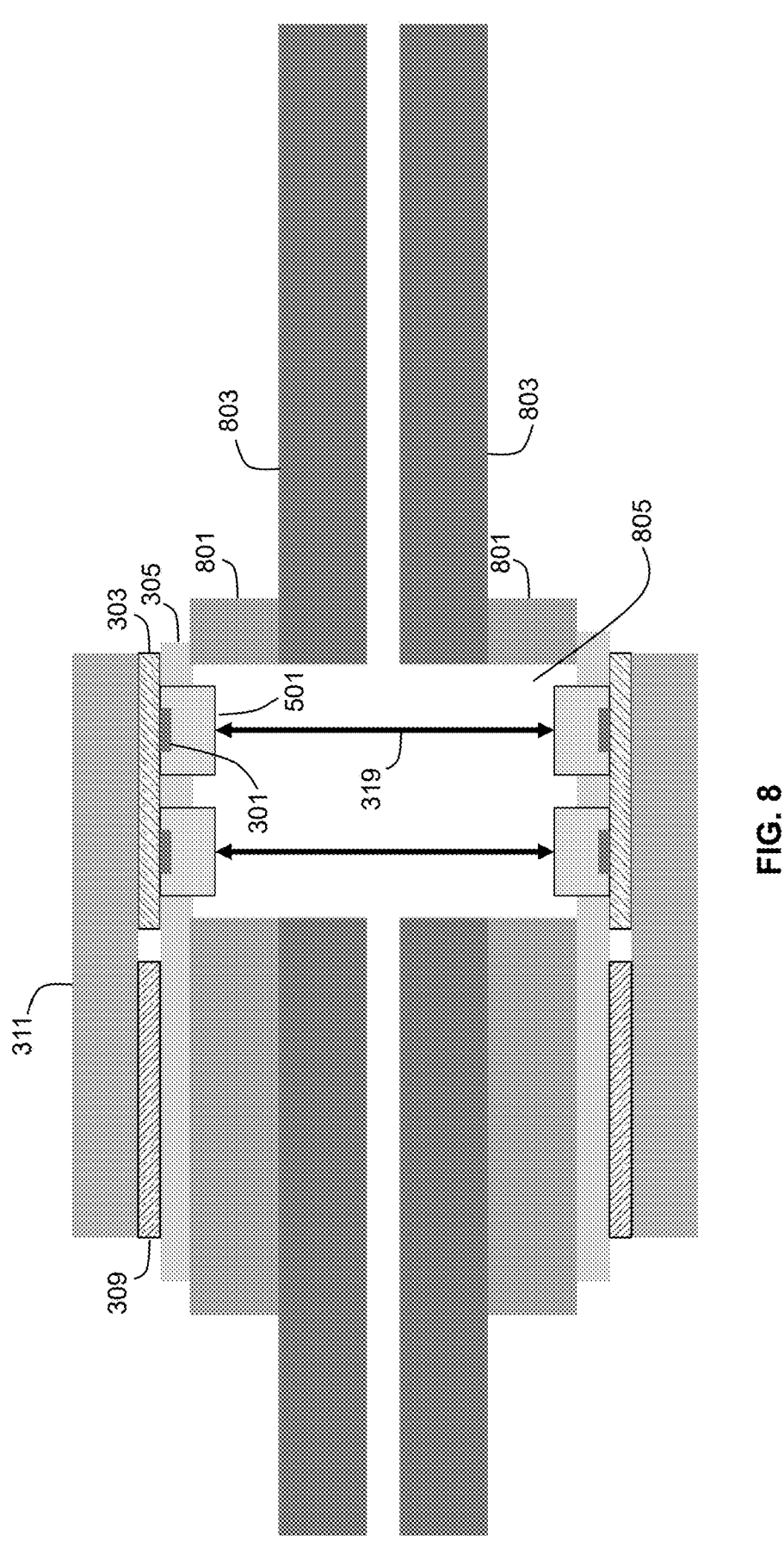
FIG. 8 shows one embodiment of optically connecting optical transceiver ICs that are attached to different package substrates and printed circuit boards, in accordance with aspects of the invention.

FIG. 8 shows one embodiment of optically connecting optical transceiver ICs that are attached to different package substrates and printed circuit boards. In some embodiments, one or more OTRIC-on-substrate assemblies 501 are mounted to a package substrate 801, which is in turn mounted to a printed circuit board 803. In this case, the substrate 305 to which the optical transceiver IC is mounted is referred to as an "interposer" substrate and provides connections from the optical transceiver IC to the package substrate. In some embodiments, the package substrate is comprised of laminated organic layers, glass, or silicon. In some embodiments, the package substrate and printed circuit board comprise openings 805 that allow parallel optical signals 319 to traverse those substrates and towards OTRIC-on-substrate assemblies that are mounted to a different package substrate and printed circuit board.

In some embodiments, multiple printed circuit board assemblies are oriented such that light is relayed between optical transceiver ICs. In some embodiments, the assemblies are arranged such that light from the transmitters on one optical transceiver IC traverses through the opening and is imaged onto the receivers on another optical transceiver IC attached to a different package substrate and printed circuit board. In some embodiments, the optical transceiver ICs on different package substrates and printed circuit boards, along with their OTRIC-on-substrate assemblies, may face each other, and the optical transmission medium between them may be free-space, as shown in FIG. 8. In some embodiments, the optics between two optical transceiver ICs is a "4f" imaging system such that each of the optical transceiver ICs is located one focal length from its associated lens and the two lenses associated with their respective optical transceiver ICs are separated by the sum of the two lens focal lengths.

Figure 9:
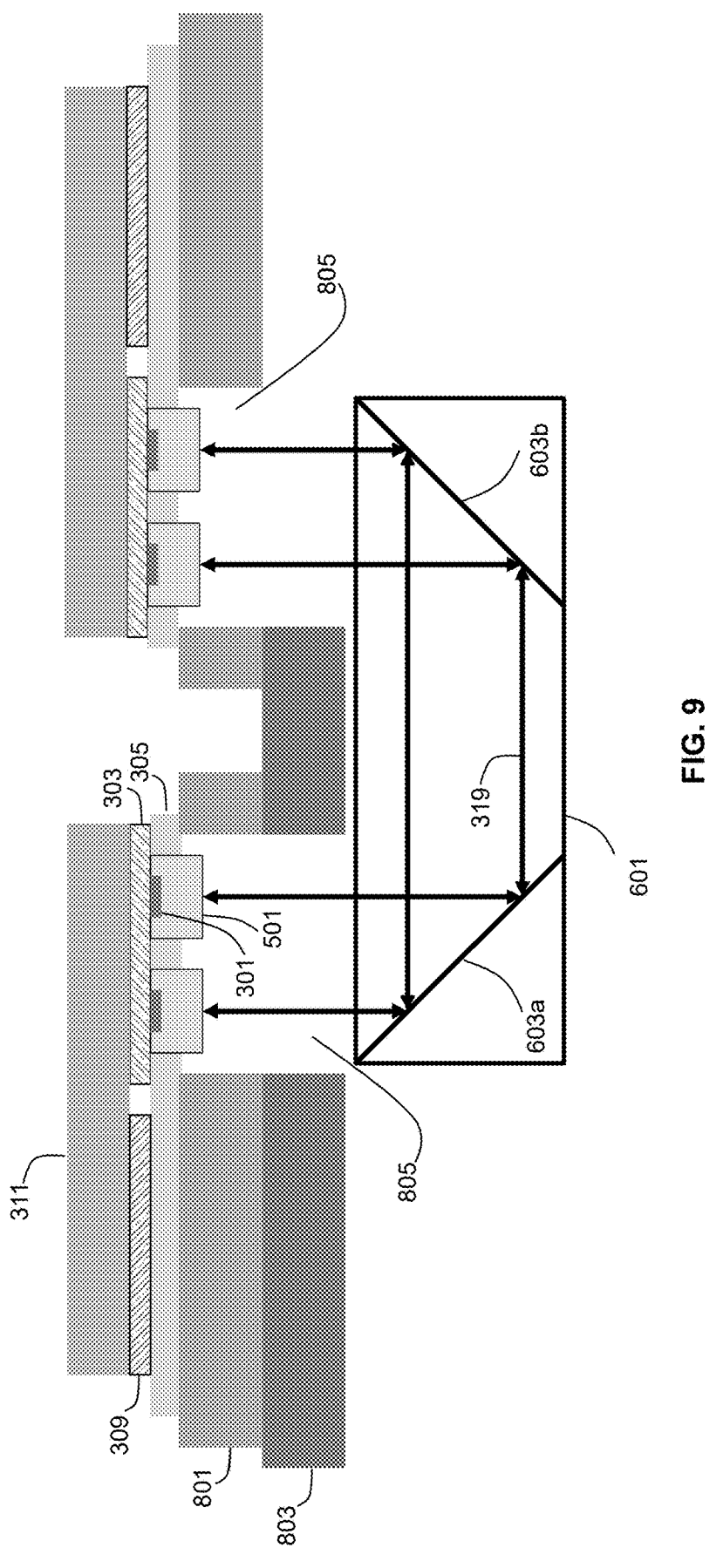
FIG. 9 shows another embodiment of optically connecting optical transceiver ICs that are attached to different package substrates, in accordance with aspects of the invention.

FIG. 9 shows another embodiment of optically connecting optical transceiver ICs that are attached to different package substrates. In some embodiments, the optical transceiver ICs 303, along with the OTRIC-on-substrate assemblies 501, are placed side-by-side and light is relayed between optical transceiver ICs using turning mirrors. In some embodiments, the OTRIC-on-substrate assemblies may be mounted to different package substrates 801, which are in turn mounted to the same or different printed circuit boards 803. In some embodiments, an optical coupling mechanism 601 may be used to optically connect the OTRIC-on-substrate assemblies on different package substrates. When the OTRIC-on-substrate assemblies are placed side-by-side to each other, as shown in FIG. 9, each package substrate and printed circuit board may have openings 805 to allow parallel optical signals 319 to traverse and reach the optical coupling mechanism. The optical coupling mechanism may in turn transmit the parallel optical signals to the corresponding OTRIC-on-substrate assemblies using one or more turning mirrors, similar to what has been described with respect to FIG. 6. In some embodiments, a single optical coupling mechanism may be used to couple more than one pair of OTRIC-on-substrate assemblies on different substrates, as shown in FIG. 9. In some embodiments, the optical transmission medium between OTRIC-on-substrate assemblies on different package substrates may be free-space.

Although the invention has been discussed with respect to various embodiments, it should be recognized that the invention comprises the novel and non-obvious claims supported by this disclosure.

What is claimed is:

1. An optical interconnect system having one or more optical transceiver integrated circuits, comprising:
    a first substrate;
    a first integrated circuit mounted to the first substrate;
    a first optical transceiver integrated circuit mounted to the first substrate, the first optical transceiver integrated circuit having a first optoelectronic device array on a side of the first optical transceiver integrated circuit facing a plane defined by the first substrate, the first optoelectronic device array configured to emit parallel optical signals;

the first optoelectronic device array having a first set of microLEDs bonded to the first optical transceiver integrated circuit;

the first substrate including electrical connections to the first integrated circuit and the first optical transceiver integrated circuit and the first substrate including a first aperture positioned to allow passage of the parallel optical signals to and from the first optoelectronic device array; and a first lens in the first aperture configured to relay parallel optical signals from the first optoelectronic device array.

2. The optical interconnect system of claim 1, wherein the first substrate is transparent to allow the relaying of parallel optical signals.

3. The optical interconnect system of claim 2, wherein the first lens is mounted to a first lens mount on an opposite side of the first substrate, relative to the first optoelectronic device array.

4. The optical interconnect system of claim 1, further comprising a heat sink on the first integrated circuit.

5. The optical interconnect system of claim 4, wherein the heat sink is also on the first optical transceiver integrated circuit.

6. The optical interconnect system of claim 5, wherein the heat sink is attached to a first surface of the first integrated circuit opposite to a second surface of the first integrated circuit used to mount the first integrated circuit to the first substrate.

7. The optical interconnect system of claim 1, further comprising:

a second substrate;

a second integrated circuit mounted to the second substrate;

a second optical transceiver integrated circuit mounted to the second substrate, the second optical transceiver integrated circuit having a second optoelectronic device array facing a plane defined by the second substrate and configured to receive parallel optical signals;

the second optoelectronic device array having a first set of photodetectors;

a second lens facing the second optoelectronic device array and configured to relay parallel optical signals to the second optoelectronic device array; and an optical transmission medium between the first optical transceiver integrated circuit and the second optical transceiver integrated circuit.

8. The optical interconnect system of claim 7, wherein the first integrated circuit is a memory integrated circuit, and the second integrated circuit is a processor integrated circuit.

9. The optical interconnect system of claim 7, wherein the first and second optical transceiver integrated circuits face each other.

10. The optical interconnect system of claim 9, wherein the optical transmission medium is free-space.

11. The optical interconnect system of claim 10, wherein the first and second optical transceiver integrated circuits are on different package substrates and printed circuit boards.

12. The optical interconnect system of claim 7, wherein the first and second optical transceiver integrated circuits are placed side-by-side to each other.

13. The optical interconnect system of claim 12, wherein the optical transmission medium is free-space and an optical coupling mechanism having one or more turning mirrors is located between the first and second optoelectronic device arrays.

14. The optical interconnect system of claim 13, wherein the first and second optical transceiver integrated circuits are on different package substrates.

15. The optical interconnect system of claim 12, wherein the optical transmission medium is a multicore optical fiber.

* * * * *